(12) United States Patent
Humble et al.

(10) Patent No.: US 10,535,097 B2
(45) Date of Patent: Jan. 14, 2020

(54) SYSTEMS AND METHODS FOR FACILITATING MEDIA PLAYBACK IN ONLINE AUCTIONS

(71) Applicant: Manheim Investments, Inc., Atlanta, GA (US)

(72) Inventors: Mark William Humble, Atlanta, GA (US); Trevor Enge, Atlanta, GA (US)

(73) Assignee: Manheim Investments, Inc., Atlanta, GA (US)

( * ) Notice: Subject to any disclaimer, the term of this patent is extended or adjusted under 35 U.S.C. 154(b) by 296 days.

(21) Appl. No.: 15/597,510

(22) Filed: May 17, 2017

(65) Prior Publication Data

US 2017/0249696 A1  Aug. 31, 2017

Related U.S. Application Data

(63) Continuation-in-part of application No. 14/729,673, filed on Jun. 3, 2015, now Pat. No. 9,684,930, which is a continuation-in-part of application No. 14/296,272, filed on Jun. 4, 2014, now Pat. No. 9,721,293.

(51) Int. Cl.
| | | |
|---|---|---|
| *G06Q 30/00* | (2012.01) | |
| *G06Q 30/08* | (2012.01) | |
| *G06F 3/16* | (2006.01) | |

(52) U.S. Cl.
CPC ............ *G06Q 30/08* (2013.01); *G06F 3/167* (2013.01)

(58) Field of Classification Search
None
See application file for complete search history.

(56) References Cited

U.S. PATENT DOCUMENTS

| | | | |
|---|---|---|---|
| 6,085,176 A | 7/2000 | Woolston | |
| 7,895,087 B1* | 2/2011 | Gottlieb | G06Q 30/0601 |
| | | | 705/26.1 |
| 2002/0062276 A1 | 5/2002 | Krueger | |
| 2005/0125331 A1* | 6/2005 | Dinwoodie | G06Q 30/08 |
| | | | 705/37 |
| 2008/0010141 A1 | 1/2008 | Smith et al. | |
| 2008/0071632 A1* | 3/2008 | Karr | G06Q 30/08 |
| | | | 705/26.3 |
| 2008/0234048 A1 | 9/2008 | Gottlieb | |
| 2012/0030055 A1 | 2/2012 | Chan | |

(Continued)

*Primary Examiner* — Mila Airapetian
(74) *Attorney, Agent, or Firm* — Eversheds Sutherland (US) LLP

(57) ABSTRACT

Systems and methods are provided for facilitating media playback in online auctions. A method may include detecting an indication of an auction event associated with an online vehicle auction for a first vehicle. The method may also include determining current auction information associated with the online vehicle auction. The method may further include determining auction event information associated with the auction event. Additionally, the method may include identifying, based at least in part on the current auction information and the auction event information, one or more media files for playback on a bidder device. The method may also include transmitting, to the bidder device in response to the indication of the auction event, the one or more media files for playback on the bidder device according to a determined sequence, which may result in acoustic output of one or more auctioneer phrases.

18 Claims, 4 Drawing Sheets

(56) References Cited

U.S. PATENT DOCUMENTS

2013/0054317 A1 2/2013 Abhyanker
2014/0143081 A1* 5/2014 Finkelstein ............ G06Q 30/08
                                                            705/26.3
2015/0032563 A1 1/2015 Moser

* cited by examiner

SYSTEMS AND METHODS FOR FACILITATING MEDIA PLAYBACK IN ONLINE AUCTIONS

CROSS-REFERENCE TO RELATED APPLICATIONS

The present disclosure claims priority to and is a continuation-in-part of U.S. application Ser. No. 14/729,673, filed Jun. 3, 2015, which claims priority to and is a continuation-in-part of U.S. application Ser. No. 14/296,272, filed Jun. 4, 2014, which are both herein incorporated herein by reference in their entirety.

TECHNICAL FIELD

The present disclosure generally relates to online auctions, and more particularly to facilitating media playback in online auctions.

BACKGROUND

Currently, online auctions are popular is a means for buying and selling goods and services. However, such online auctions may lack the interactions associated with live, physical auctions conducted by an auctioneer, including, for example, the auctioneer's canter, which may excite the auction participants. In other instances, the auctions may require the technical and logistical challenges of broadcasting a physical auction or of broadcasting a live stream of a human auctioneer. Therefore, in certain instances, online auctions may be less engaging and drive less activity for a given product or service, i.e., fail to result in market realization, when compared to live auctions.

BRIEF DESCRIPTION OF THE DRAWINGS

Reference will now be made to the accompanying figures and diagrams, which are not necessarily drawn to scale, and wherein.

DETAILED DESCRIPTION

Figure 1:
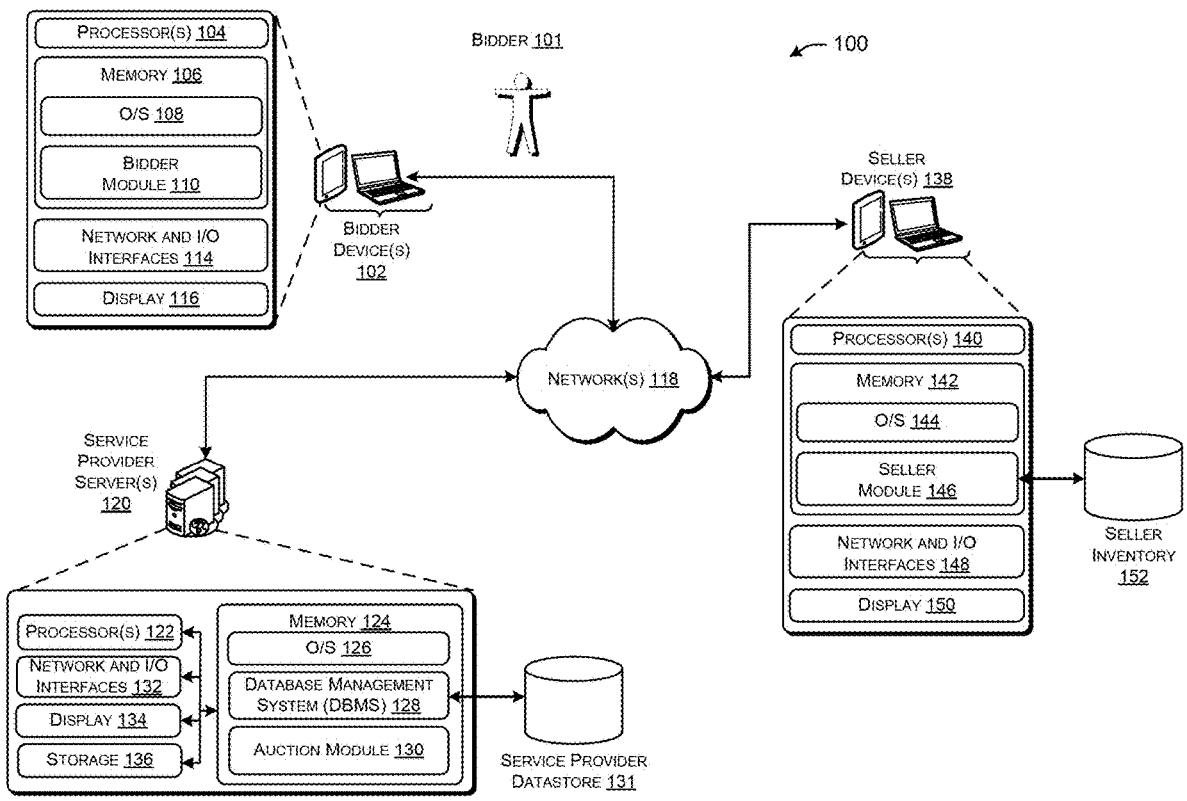
FIG. 1 shows a system for facilitating media playback in online auctions according to one or more example embodiments.

In the following description, numerous specific details are set forth. However, it should be understood that embodiments of the present disclosure may be practiced without these specific details. In other instances, well-known methods, structures, and techniques have not been shown in detail in order not to obscure an understanding of this description. References to "one embodiment," "an embodiment," "example embodiment," "various embodiments," and so forth indicate that the embodiment(s) of the present disclosure so described may include a particular feature, structure, or characteristic, but not every embodiment necessarily includes the particular feature, structure, or characteristic. Furthermore, the repeated use of the phrase "in one embodiment" does not necessarily refer to the same embodiment, although it may.

As used herein, unless otherwise specified, the use of the ordinal adjectives "first," "second," "third," etc., to describe a common object merely indicates that different instances of like objects are being referred to and are not intended to imply that the objects so described must be in a given sequence, either temporally, spatially, in ranking, or in any other manner.

As used herein, unless otherwise specified, the term "device" refers, in general, to an electronic communication device, both wired and wireless, and more particularly to one or more of the following: a portable electronic device, a telephone (e.g., cellular phone, smartphone), a computer (e.g., laptop computer, tablet computer, desktop computer, wearable computer), a portable media player, a personal digital assistant (PDA), a kiosk computer for public use, or any other electronic device having a networked capability.

As used herein, unless otherwise specified, the term "server" may refer to any computing device having a networked connectivity and configured to provide one or more dedicated services to clients, such as a mobile device. The services may include storage of data or any kind of data processing. One example of a central server may include a web server hosting one or more web pages. Some examples of web pages may include auction web pages, dealer web pages, bidder web pages, vehicle information web pages, and/or the like. Another example of a server may be a cloud server that hosts web services for one or more computer devices.

As used herein, unless otherwise specified, the term "web page" may correspond to one or more web pages as part of one or more websites, mobile-optimized websites or automatically-optimized websites.

According to one or more embodiments of the disclosure, a method is provided. The method may include detecting, by a service provider server comprising one or more processors, an indication of an auction event associated with an online vehicle auction for a first vehicle. The method may also include determining current auction information associated with the online vehicle auction. The method may further include determining auction event information associated with the auction event. Additionally, the method may include identifying, based at least in part on the current auction information and the auction event information, one or more media files for playback on a bidder device. The method may also include determining a sequence in which to play the one or media files. For example, the method may also include automatically sequencing the one or more media files for playback on the bidder device. The method may also include transmitting, to the bidder device in response to the indication of the auction event, the one or more media files for playback on the bidder device according to the determined sequence. The playback of the one or more media files according to the determined sequence may result in acoustic output of one or more auctioneer phrases. The method may also include updating and/or resequencing the one or more media files for transmission to the bidder device based on the indication of an auction event received from the bidder device.

According to one or more embodiments of the disclosure, a system is provided. The system may have at least one processor and at least one memory storing computer-readable instructions. When the instructions are executed by the at least one processor, the instructions may cause the at least one processor to detect an indication of an auction event associated with an online vehicle auction for a first vehicle. The instructions may further cause the at least one processor to determine current auction information associated with the online vehicle auction. Moreover, the instructions may cause the at least one processor to determine auction event information associated with the auction event. The instructions may further cause the at least one processor to identify, based at least in part on the current auction information and the auction event information, one or more media files for playback on a bidder device. The instructions may also cause the at least one processor to determine a sequence in which to play the one or media files. Additionally, the instructions may further cause the at least one processor to transmit, to the bidder device in response to the indication of the auction event, the one or more media files for playback on the bidder device according to the determined sequence. The playback of the one or more media files according to the determined sequence may result in acoustic output of one or more auctioneer phrases.

According to one or more embodiments of the disclosure, a non-transitory computer-readable medium is provided. The non-transitory computer-readable medium may have embodied thereon instructions executable by one or more processors. The instructions may cause the one or more processors to detect an indication of an auction event associated with an online vehicle auction for a first vehicle. Furthermore, the instructions may cause the one or more processors to determine current auction information associated with the online vehicle auction. Additionally, the instructions may cause the one or more processors to determine auction event information associated with the auction event. The instructions may also cause the one or more processors to identify, based at least in part on the current auction information and the auction event information, one or more media files for playback on a bidder device. The instructions may also cause the at least one processor to determine a sequence in which to play the one or media files. Moreover, the instructions may cause the one or more processors to transmit, to the bidder device in response to the indication of the auction event, the one or more media files for playback on the bidder device. The playback of the one or more media files according to the determined sequence may result in acoustic output of one or more auctioneer phrases.

The above principles, and perhaps others, are now illustrated with reference to FIG. 1, which depicts a system 100 for facilitating media playback in online auctions. The system 100 may include one or more bidder devices 102 associated with one or more bidders, such as bidders 101. The bidder device(s) 102 may be in communication with, via one or more network(s) 118, one or more service provider server(s) 120, and one or more seller device(s) 138.

In general, the bidder device 102 may refer to any type of electronic device, and, more particularly, may refer to one or more of the following: a wireless communication device, a portable electronic device, a telephone (e.g., cellular phone, smart phone), a computer (e.g., laptop computer, tablet computer), a wearable computer device, a portable media player, a personal digital assistant (PDA), or any other electronic device having a networked capability. The bidder device(s) 102 may include one or more computer processors 104, and a memory 106 storing an operating system (O/S) 108 and a bidder module 110. In addition, the bidder device(s) 102 may include one or more network and I/O interfaces 114, and a display 116. In certain embodiments, the bidder device(s) 102 may include one or more sensors capable of gathering information associated with a present environment of the bidder device(s) 102, or similar hardware devices, such as a camera, microphone, antenna, a gesture capture or detection device, or Global Positioning Satellite (GPS) device.

The computer processors 104 may comprise one or more cores and may be configured to access and execute (at least in part) computer-readable instructions stored in the memory 106. The one or more computer processors 104 may include, without limitation: a central processing unit (CPU), a digital signal processor (DSP), a reduced instruction set computer (RISC), a complex instruction set computer (CISC), a microprocessor, a microcontroller, a field programmable gate array (FPGA), or any combination thereof. The bidder device 102 may also include a chipset (not shown) for controlling communications between the one or more processors 104 and one or more of the other components of the bidder device 102. In certain embodiments, the bidder device 102 may be based on an Intel® architecture or an ARM® architecture, and the processor(s) and chipset may be from a family of Intel® processors and chipsets. The one or more processors 104 may also include one or more application-specific integrated circuits (ASICs) or application-specific standard products (ASSPs) for handling specific data processing functions or tasks.

The memory 106 may include one or more computer-readable storage media (CRSM). In some embodiments, the memory 106 may include non-transitory media such as random access memory (RAM), flash RAM, magnetic media, optical media, solid state media, and so forth. The memory 106 may be volatile (in that information is retained while providing power) or non-volatile (in that information is retained without providing power). Additional embodiments may also be provided as a computer program product including a transitory machine-readable signal (in compressed or uncompressed form). Examples of machine-readable signals include, but are not limited to, signals carried by the Internet or other networks. For example, distribution of software via the Internet may include a transitory machine-readable signal. Additionally, the memory 106 may store an operating system 108 that includes a plurality of computer-executable instructions that may be implemented by the computer processor to perform a variety of tasks to operate the interface(s) and any other hardware installed on the bidder device 102. The memory 106 may also store content that may be displayed by the bidder device 102 or transferred to other devices (e.g., headphones) to be displayed or played by the other devices. The memory 106 may also store content received from the other devices. The content from the other devices may be displayed, played, or used by the bidder device 102 to perform any necessary tasks or operations that may be implemented by the computer processor or other components in the bidder device 102.

The memory 106 may also include an operating system (O/S) 108, which may provide an interface between other application software executing on the bidder device 102 and hardware resources of the bidder device 102. More specifically, the operating system 108 may include a set of computer-executable instructions for managing hardware resources of the bidder device 102 and for providing common services to other application programs (e.g., managing memory allocation among various application programs). The operating system 108 may include any operating system now known or which may be developed in the future including, but not limited to, any bidder operating system, any server operating system, any mainframe operating system, or any other proprietary or freely available operating system.

The memory 106 may also include a bidder module 110, which may be configured to enable a bidder's access to one or more services offered by a service provider (e.g., via the service provider server(s) 120). As such, the bidder module 110 may include a dedicated application that may be executed by the bidder devices 102. In other implementations, the bidder module 110 may provide a web interface (e.g., web browsing capabilities) to access one or more web pages provided by the service provider servers 120. The service offered by the service provider may include one more online auctions, such as online vehicle auctions and/or any other type of auctions. For example, the bidder module 110 may provide an interface for the bidder 101 to interact with an online vehicle auction (e.g., choosing a particular vehicle auction, bidding on a vehicle in the auction, requesting vehicle information, etc.). It will be appreciated that while certain examples and description may refer to an online vehicle auction, the systems and methods described herein may also apply to any type of online auction.

In some embodiments, the bidder module 110 may also interact with the service provider server(s) 120 to facilitate playback of media by the bidder device 102 in response to an auction event. For instance, a conventional auction may include a live auctioneer to articulate various auction events. As used herein, an auction event may include, but is not limited to, a welcome announcement, an auction start time, an auction initiation, a vehicle introduction, an auction bid, a new auction ask price, an auction call for more bids, a sold vehicle, an unsold vehicle, a time remaining threshold, a sale call, an elapsed time with no bidding, an auction end time, a no-sale call, and/or any other event that may occur during an auction. Additionally, the auctioneer might provide auction banter or chant intended to build and/or maintain excitement in the auction process. In contrast, an online vehicle auction provided by the service provider server(s) 120 may not include a live auctioneer to announce various auction events that may occur during the online auction. Instead, the bidder module 110 may be configured to play back one or more media files in response to occurrence of an auction event (e.g., a bid made by any of the bidders in the online auction). For instance, the media files may be stored by the service provider server(s) 120, and in response to the auction event, the service provider server(s) 120 may provide the media files to the bidder device 102 and/or bidder module 110. To this end, the media files may include prerecorded audio, video, text, and/or other types of media files that may be played back by the bidder module 110 depending on the type of auction event.

In other embodiments, the media files may be transmitted to the bidder device 102 before an online auction begins. For instance, the media files may be stored in memory 106 and/or another storage component associated with the bidder device 102. If the bidder device 102 determines an occurrence of auction event (e.g., receives an indication of an auction event from the service provider server(s) 120), the bidder module 110 may be configured to identify the appropriate media files in response to the auction event. Additionally, the bidder module 110 may be configured to determine an order or sequence in which to play the identified media files and execute playback of the identified media files according to order or sequence.

Additionally, the media files may be associated with different auctioneer phrases. For instance, some media files may include auctioneer announcements of numbers (e.g., "thirty-five," "thirty-six", etc.). Some media files may include generic phrases that may be uttered by auctioneers, such as "can I get a" or "do I hear a" or "thank you." Other media files may include auctioneer announcements identifying the make, model, and/or the like of a vehicle, such as "Chevy" or "Toyota" or "Honda Accord." Still other media files may include auctioneer announcements of various options, trims, packages, that may be associated with a vehicle, such as "navigation" or "sunroof." Certain media files may also include auctioneer announcements related to financial aspects of a vehicle, such as "clean title." It will be appreciated that the media files may include any number of auctioneer phrases, announcements, calls and/or the like. Furthermore, the media files may include auctioneer phrases corresponding to different auctioneer voices, languages, accents, and/or the like.

To this end, the bidder module 110 may execute playback of a sequence of one or more of these media files in order to generate an acoustic output of one or more auctioneer phrases. In other words, playing the media files in a particular sequence may result in a naturalistic sounding auctioneer, which mimics the flow and timing of a live auctioneer. For instance, the bidder module 110 may receive an indication of an auction event that includes an auction call for more bids. In some implementations, the indication may include auction event information identifying the vehicle, auction bid amount, and auction call type. The bidder module 110 may identify, based on the auction event information, media files associated with the phrases "do I hear a," "Honda Accord," "for," "the," and "thirty-five." Moreover, the bidder module 110 may determine a sequence of playing the identified media files that may result in the playback of the announcement, "Do I hear a thirty-five for the Honda Accord?"

Referring again to the bidder device 102, the one or more network and I/O interfaces 114 may include one or more communication interfaces or network interface devices to provide for the transfer of data between the bidder device 102 and another device (e.g., network server) via one or more networks, such as 118. The communication interfaces may include, but are not limited to: personal area networks (PANs), wired local area networks (LANs), wireless local area networks (WLANs), wireless wide area networks (WWANs), and so forth. The bidder device 102 may be coupled to the network via a wired or wireless connection. Wireless system interfaces may include the hardware and software to broadcast and receive messages either using the Wi-Fi Direct Standard (see Wi-Fi Direct specification published in October 2010) and/or the IEEE 802.11 wireless standard (see IEEE 802.11-2007, published Mar. 8, 2007; IEEE 802.11n-2009, published October 2009), or a combination thereof. The wireless system (not shown) may include a transmitter and a receiver or a transceiver (not shown) capable of operating in a broad range of operating frequencies governed by the IEEE 802.11 wireless standards. The communication interfaces may utilize acoustic, radio frequency, optical, or other signals to exchange data between the bidder device 102 and another device, such as an access point, a host computer, a server, a router, a reader device, and the like. The networks 118 may include, but are not limited to, the Internet, a private network, a virtual private network, a wireless wide area network, a local area network, a metropolitan area network, a telephone network, and so forth.

The display 116 may include, but is not limited to, a liquid crystal display, a light-emitted diode display, or an E-Ink™ display as made by E Ink Corp. of Cambridge, Mass. The display 116 may be used to show content to a user in the form of text, images, or video. In certain instances, the display 116 may also operate as a touch screen display that may enable the user to initiate commands or operations by touching the screen using certain finger or hand gestures.

With continued reference to FIG. 1, one or more service provider server(s) 120 may also be in communication with the network(s) 118. The service provider server(s) 120 may also include processor(s) 122 and memory 124, which may store an operating system (O/S) 126, a database management system (DBMS) 128, and an auction module 130.

The computer processors 122 may comprise one or more cores and may be configured to access and execute (at least in part) computer-readable instructions stored in the memory 124. The one or more computer processors 122 may include, without limitation: a central processing unit (CPU), a digital signal processor (DSP), a reduced instruction set computer (RISC), a complex instruction set computer (CISC), a microprocessor, a microcontroller, a field programmable gate array (FPGA), or any combination thereof. The service provider server 120 may also include a chip set (not shown) for controlling communications between the one or more processors 122 and one or more of the other components of the service provider server 120. In certain embodiments, the service provider server 120 may be based on an Intel® architecture or an ARM® architecture, and the processor(s) and chipset may be from a family of Intel® processors and chipsets. The one or more processors 122 may also include one or more application-specific integrated circuits (ASICs) or application-specific standard products (ASSPs) for handling specific data processing functions or tasks.

The memory 124 may include one or more computer-readable storage media (CRSM). In some embodiments, the memory 124 may include non-transitory media such as random access memory (RAM), flash RAM, magnetic media, optical media, solid state media, and so forth. The memory 124 may be volatile (in that information is retained while providing power) or non-volatile (in that information is retained without providing power). Additional embodiments may also be provided as a computer program product including a transitory machine-readable signal (in compressed or uncompressed form). Examples of machine-readable signals include, but are not limited to, signals carried by the Internet or other networks. For example, distribution of software via the Internet may include a transitory machine-readable signal. Additionally, the memory 124 may store an operating system 126 that includes a plurality of computer-executable instructions that may be implemented by the computer processor to perform a variety of tasks to operate the interface(s) and any other hardware installed on the service provider server 120. The memory 124 may also store content that may be displayed by the service provider server 120 or transferred to other devices (e.g., headphones) to be displayed or played by the other devices. The memory 124 may also store content received from the other devices. The content from the other devices may be displayed, played, or used by the service provider server 120 to perform any necessary tasks or operations that may be implemented by the computer processor or other components in the service provider server 120.

The DBMS 128 stored in memory 124 may be configured to support functionality for accessing, retrieving, storing, and/or manipulating data stored in external datastore(s) (e.g., service provider datastore 131), data stored in the memory 124, and/or data stored in the datastore 131. The DBMS 128 may use any of a variety of database models (e.g., relational model, object model, etc.) and may support any of a variety of query languages.

According to one or more embodiments, the DBMS 128 may be configured to store, retrieve, and/or otherwise access various data related to facilitating media playback in online auctions from the service provider datastore 131. For example, the DBMS 128 may be configured to retrieve and/or or store account data associated with a bidder 101. For example, account data may include contact information, finance option information, credit information, vehicle purchase history information, vehicle browsing history, vehicle preferences, current vehicles being viewed, account setting (e.g., notifications, etc.), and/or any other type of data associated with the bidder 101. Furthermore, the service provider datastore 131 may store information related various auction information, auction event information, and/or media files. For instance, auction information may include information associated with at least one of an auction identifier, a bidder name, a seller name, a current ask price, one or more vehicle attributes associated with the first vehicle, an auction location, a floor price, a target price, and/or the like. Auction event information may include information associated with at least one of a welcome announcement, an auction start time, an auction initiation, a vehicle introduction, an auction bid, a new auction ask price, an auction call, a sold vehicle, an unsold vehicle, a time remaining threshold, a sale call, an elapsed time with no bidding, an auction end time, a no-sale call, and/or any other event that may occur during an auction. Based at least in part on such data (e.g., the auction information and/or the auction event information), the service provider server 120 (e.g., via the auction module 130 discussed below) may be capable of providing media files to various bidder device(s) 102 in response to one or more auction events during an online auction.

The memory may also include an auction module 130. The auction module 130 may be configured to communicate with the bidder device(s) 102 and the seller device(s) 138 in order to facilitate the operation of one or more online vehicle auctions. For instance, during an online vehicle auction, the auction module 130 may be configured to detect an occurrence of an auction event. Upon detecting the auction event, the auction module 130 may determine auction event information associated with the auction event and current auction information associated with the online vehicle auction. The auction event information may indicate a type of auction event (e.g., a welcome announcement, an auction start time, a vehicle introduction, an auction bid, a new auction ask price, a sold vehicle, an unsold vehicle, a time remaining threshold, an elapsed time with no bidding, an auction end time, advertisements, vehicle feature announcements, banter, no sale, bidder name, meeting green light conditions (NAAA arbitration eligibility), vehicle title attributes, and/or any other event that may occur during an auction). The current auction information may include information associated with a current state of the online vehicle auction, such as bidder names associated with participating bidders, the seller name, the current ask price, a current bid amount, etc. Based at least in part on the current auction information and the auction event information, the auction module 130 may identify one or more media files for playback on one or more bidder device(s) 102. In certain embodiments, the one or more media files may be one or more prerecorded audio files that include various auction announcements corresponding to the auction event. Upon identifying the one or more media files, the auction module 130 may be configured to transmit, stream, sequence and/or otherwise provide the media files to one or more bidder device(s) 102 for playback on the respective bidder device(s) 102.

According to one or more embodiments, the media files may be stored in a service provider datastore 131. To this end, the media files may be accessed by the auction module 130 via the DBMS 128. For instance, each auction event may be associated with respective event identifiers. The DBMS 128 may be configured to index certain media files by auction event identifiers such that different media files may correspond to different auction event identifiers. For example, a welcome announcement auction event may be associated with a first event identifier, which may correspond to a prerecorded audio file that includes an auctioneer voice giving a welcome announcement. On the other hand, another auction event may include a sold vehicle at the online auction. This auction event may be associated with a second vehicle identifier, which may correspond to another recorded audio file that indicates a vehicle has been sold. In some embodiments, inactivity or a lack of auction events may correspond with a trigger associated with one or more media files. For instance, if there is a lack of activity following the start of the auction for a given vehicle that may correspond to the trigger for one or more media files about certain vehicle attributes.

Furthermore, the datastore 131 may be configured to store other media files corresponding to the current auction information (e.g., bidder names, bid amounts, ask price, vehicle attributes, seller name, auction name, time, date, and/or the like). The media files may be combined with the media files indexed by the event identifiers to form different announcements. For instance, a welcome announcement may be associated with a first media file that includes a welcome message and a second media file that includes a seller name (e.g., the first media file includes the message, "Welcome to the auction presented by" and the second media file includes "Mike's Dealership"). Thus, in view of the operations described above, the auction module 130 may be configured to identify different combinations of media files based on auction event information and current auction information. The different combination of media files may correspond to different announcements, which may be played back by one or more bidder device(s) 102 and/or seller device(s) 138 in response to different auction events.

For example, in some embodiments, the auction event may include an auction start time. As such, the auction module 130 may be configured to identify one or more media files that include an announcement indicating that the online vehicle auction is starting or that the auctioning of the next vehicle is starting.

In other embodiments, the auction event may include a vehicle introduction. As such, the auction module 130 may be configured to identify one or more media files that include an announcement identifying the vehicle. Additionally, the announcement may also identify one or more vehicle attributes associated with the vehicle including, but not limited to, a make, model, year, mileage, trim, options, depreciation value, residual value, wholesale price, retail price, geographic location, vehicle supply, vehicle demand, and/or the like.

In other embodiments, the auction event may include an auction bid request. For example, the auction module 130 may receive an indication to request auction bids from the participating bidder(s) 101 (e.g., requesting bids at the next bid increment). As such, the auction module 130 may be configured to identify one or more media files that include an announcement requesting auction bids from the bidders 101 and/or bidder device(s) 102.

In other embodiments, the auction event may include a sold vehicle. As such, the auction module 130 may be configured to identify one or more media files that include an announcement indicating that a particular vehicle has been sold. Additionally, the announcement may indicate the bidder name of the winning bidder and/or thank the winning bidder.

In other embodiments, the auction event may include an unsold vehicle. As such, the auction module 130 may be configured to identify one or more media files that include an announcement indicating that a particular vehicle has not reached its designated floor price within an auction time frame.

In other embodiments, the auction event may be that a vehicle has not reached its floor price within a predetermined amount of time. To this end, the auction module 130 may be configured to identify one or more media files that include an announcement indicating that a particular vehicle has not reached its designated floor price prior to a lull of a threshold length in the auction activity.

In other embodiments, the auction event may include a vehicle reaching its floor price. As such, the auction module 130 may be configured to identify one or more media files that indicate that the floor price for the vehicle has been reached. Furthermore, the one or more media files may also indicate that certain bidder should participate in the auction since the floor price has been reached.

In other embodiments, the auction event may include a time remaining threshold. As such, the auction module 130 may be configured to identify one or more media files that include an announcement indicating an amount of time remaining for the auction. Alternatively and/or additionally, the announcement may indicate an amount of time remaining for a particular vehicle to receive bids.

In other embodiments, the auction event may include an elapsed time with no bidding. As such, the auction module 130 may be configured to identify one or more media files that include an announcement for the purpose of enticing new bids. For instance, the announcement may include one or more features associated with the vehicle being presented (e.g., vehicle specifications, vehicle options, and/or other vehicle attributes). As another example, the announcement may include reviews and/or ratings associated with the vehicle.

In other embodiments, the auction event may include an auction end time. As such, the auction module 130 may be configured to identify one or more media files that include an announcement indicating that the online vehicle auction has ended. In yet other embodiments, the system may determine that an auction floor has been exceeded and that there is a lull of at least a threshold value in the auction activity. In response to such lull, the auction module 130 may be configured to identify one or more media files indicating the highest bid and indicating that the auction is about to close and/or calling for final bids. Such media files may also correspond to phrases that may be used to entice further bidding (e.g., conversational phrases such as "come on you guys"). Additionally, the threshold value of the lull (e.g., a predetermined amount of time) may be determined dynamically depending on context. For instance, the auction module 130 may determine that a large amount of bidding activity has recently occurred between a relatively large number of bidders. Accordingly, the auction module 130 may determine that more bidding activity may be likely to occur. As a result, the auction module 130 may determine the threshold value of the lull to be relatively high. On the other hand, the auction module 130 may determine that bidding activity has slowed to between a relatively low number of bidders. In such a scenario, the auction module 130 may determine the threshold value of the lull to be relatively low.

According to some embodiments, an auction event may include a period of inactivity after announcing the initial asking but before a first bid has been submitted for a vehicle. To this end, the auction module 130 may be configured to automatically lower the initial asking by a predetermined amount (e.g., such as an amount indicated by a seller device 138).

In other embodiments, the auction event may include advertisements. As such, the auction module 130 may be configured to identify one or more media files that include an announcement indicating the advertisement.

In some instances, it may be cost prohibitive to fly an auctioneer to a location. In such a case, there may be an auction administrator or block clerk at the site who may enter the incremental bids on various vehicles, e.g., likely by hitting a bid button, but the auction chant would be provided using the same logic that drives the online variation. Of course, not only could there be in person bidders, but also online bidders.

In another embodiment, a mobile auction may be conducted in which the onsite bidders could be issued paddles or the like that could be identified via sensors or cameras when waived or raised to indicate an intention to bid. In that way, the block clerk could be cut out of the process and the auction could be administered automatically. The bidders could also log their bids via mobile devices as if they were remote participants.

In some embodiments, the auction module 130 may also determine, for a particular auction, that one or more bidders may be interested in a vehicle that is not included in the auction. Thus, the auction module 130 may be configured to add the vehicle to the auction. The addition of the vehicle to the auction may be contingent upon receiving authorizations from the auction seller to add vehicles to the auction and the seller of the vehicle to place the vehicle in a different auction.

As noted above, the DBMS 128 stored in memory 124 may be configured to support functionality for accessing, retrieving, tracking, storing, and/or manipulating data stored in external datastore(s) (e.g., service provider datastore 131), data stored in the memory 124, and/or data stored in the datastore 131. In some instances, the datastore 131 and/or the memory 124 may be configured to compile, track, and/or store information associated with the bidders 101. For example, the datastore 131 and/or memory 124 may include bidder information, such as contact information, finance option information, credit information, vehicle purchase history information, vehicle browsing history, vehicle preferences, current vehicles being viewed, account setting (e.g., notification settings, etc.), bidding history, bidding preferences, and/or any other type of data associated with the bidders 101. Based on such information, the auction module 130 may determine that one or more of the bidders 101 may be interested in a certain category of vehicles or a specific make and model. In response, the auction module 130 may be configured to setup an auction sua sponte that is directed to such bidders 101 and invite such bidders 101 to participate in the auction.

For example, a number of bidders 101 may be logged into the system. The auction module 130 may determine, based on the bidder information discussed above, that many of the logged-in bidders 101 have in the past and/or are currently looking for a particular type of vehicle (e.g., Ford trucks, SUVs, high-end vehicles, etc.). Based on this information, the auction module 130 may query and filter the various seller databases to see how many vehicles (e.g., Ford trucks) fit the auction criteria and are available for auction. The auction module 130 may compile all available vehicles (e.g., Ford trucks) that fit the auction criteria into a single auction. In some instances, the addition of the specific vehicles to the auction may be contingent upon receiving approval and/or preauthorization from the auction seller to add vehicles to the auction. The auction module 130 may notify the logged-in bidders 101 regarding the time of the auction and invite them to participate. In addition, as additional bidders 101 log into the system, the auction module may determine if they too should be invited into the auction based on their past and/or current vehicle preferences. A threshold number of bidders 101 may be required to share a common vehicle preference before the auction module 130 sets up an auction. The auctions may be considered dynamic and/or spontaneous since they occur based on currently logged-in bidders 101 and may change in size or type of vehicles being sold in response to additional bidders 101 logging in and/or logging out.

In some instances, the timing of the auction may depend on how many bidders 101 are likely to be available for the auction. For example, the auction may take place immediately if enough bidders 101 are logged into the auction. The bidders 101 may choose to participate in the auction, which may include vehicles geared towards their preferences. Moreover, in some instances, the auction module 130 may provide a notification to other bidders 101 whose profiles indicate that they would be interested in the auction of vehicles but are not currently logged into the system. In such instances, based on the bidders 101 account settings, the auction module 130 may provide push notifications (e.g., text) or other notifications (e.g., email, phone call, etc.) to the bidders 101. In this manner, the auction module 130 may pick a date, time, and vehicle(s) for auction based on bidder information and bidder preferences. The auction module 130 also may dynamically invite bidders 101 to join the auction if their bidder information indicates that they would likely participant in the auction. The auction may take place immediately, if enough bidders 101 are available, or at a future time. In some instances, the auction may be defined as spontaneous since it is at least partially based on currently logged-in bidders.

The auction module 130 may be configured to setup an auction for any reason. For example, the auction module 130 may setup an auction based on a time interval, such as every hour. In some instances, the auction module 130 may provide push notifications (e.g., text) or other notifications (e.g., email, phone call, etc.) to the bidders 101 prior to the start of an auction.

In some embodiments, the auction module 130 may be configured to setup multiple auctions at a time. For example, multiple spontaneous auctions may occur simultaneously. That is, the auction module 130 may determine, based on the bidder information discussed above, that many of the logged-in bidders 101 have in the past and/or are currently looking for two or more particular types of vehicles (e.g., Ford trucks, SUVs, high-end vehicles, etc.). Based on this information, the auction module 130 may query and filter the various seller databases to see how many vehicles fit the auction criteria and are available for auction. In other embodiments, multiple spontaneous auctions with overlapping types of vehicles may run simultaneously, and for vehicles within an overlapping region, both auctions participants (bidders 101) may view and bid on the same vehicles. In other instances, the system may determine that there is overlapping interest between the logged-in users for two or more sales, and may therefore determine not to run simultaneous sales, but rather to run staggered sales. That is, the system may determine that there are threshold numbers of users interested in Ford Mustangs and Chevrolet Silverados, however there are a number of users interested in both sales, and therefore holding staggered sales will achieve better participation and marketing price realization.

In some instances, the auction module 130 may be configured to identify a threshold number of bidders 101 logged into the website that are viewing similar types of vehicle inventory (e.g., the same make and model or similar makes and models). The auction module 130 may notify the bidders 101 that a dynamic auction will begin within a period of time, automatically preparing a run list for the sale and making the run list inventory available for user review, and then beginning the virtual online auction. In some embodiments, the inventory stocked into the sale may vary based on the bidding activity. For example, if a 2013 Nissan Maxima performs exceedingly well or attracts a higher proportion of bidders 101 than the system predicted, additional 2013 Nissan Maximas may be added to the sale. In another embodiment, the vehicles placed into the auction may not all be from one auction platform. Instead, in a multi-platform environment, the system may identify that there are sufficient bidders 101 on one system (and predict users on other systems) or may identify users across multiple systems and then launch a virtual auction. The inventory in this virtual auction could come from several different auction systems (e.g., OVE, OpenLane, AuctionEdge, etc.). In some embodiments, the size of the virtual sale (i.e., the number of units) may vary in relation to the number of bidders 101 online that have indicated an interest in that particular style of vehicle.

In addition, in some instances, the auction module 130 may be configured to dynamically add and/or remove vehicles from a dynamic auction run list based on the current and/or prior bidding activity. For example, as discussed above, if a certain type, make, and/or model of vehicle performs exceedingly well or attracts a higher proportion of bidders 101 than the system predicted, additional vehicles of a similar type, make, and/or model may be added to the dynamic run list. More so, the run list may dynamically change as different bidders 101 join and leave the auction. For example, as different bidders 101 join or leave the auction, the common vehicle preferences of the collective group of bidders 101 in the auction may change. In this manner, the auction module 130 may determine, based on the bidder information and prior bidding activity discussed above, that many of the bidders 101 in the auction have in the past and/or are currently looking for and/or have bid on a particular type of vehicle (e.g., Ford trucks, SUVs, high-end vehicles, etc.). As a result, the system may dynamically change the run order of the vehicles to attract a higher proportion bids on the vehicles and to maintain the interest of the bidders 101 so that they do not leave the auction. That is, the dynamic rearrangement of the run list of the action may increase bidding and/or interest by the bidders 101.

Sellers who list vehicles for sale on the auction platforms may select whether or not their vehicles may be added to these dynamic, virtual sales. Further, in some embodiments, the sellers may select the threshold levels at which their vehicles may be added to the virtual sales.

The system may pull inventory for addition to the virtual sale from inventory that is online in timed or other auction systems. This inventory may feature an icon that indicates that it may be pulled into such an auction. In that case, the last bid from the timed auction becomes the floor price, and any proxy bids would remain in force and be entered in response to the live bidding environment.

Moreover, it will be appreciated that for a particular auction event, the auction module 130 may be configured to identify different sets of media files for playback for different bidder devices 102. As a result, the auction module 130 may enable different users of the bidder devices 102 to experience personalized auctioneer announcements that may be relevant to the users' situations. For example, consider a scenario in which Jane has submitted the highest bid, which outbids Steve's second highest bid. The auction nodule 130 may identify a first set of media files that when played back (e.g., in a sequence determined by the auction module 130 and/or bidder module 110 on Steve's device) by Steve's device, may announce to Steve that he has been outbid and to encourage him to keep bidding. Meanwhile, the auction module 130 may identify a second set of media files that when played back on Jane's device (e.g., in a sequence determined by the auction module 130 and/or bidder module 110 on Jane's device), may announce that Jane has the current top bid.

According to certain embodiments, the auction module 130 may also be configured to receive analytics information associated with various auction events. For example, the auction module 130 may receive and/or gather analytics information associated with auctioneer accents, the pace of playback for media files, the types of phrases played back, and/or the like that are identified in response to certain auction events. For example, the auction module 130 may receive feedback (e.g., sales data, ratings data, and/or the like) indicating that southern accents are particular popular or unpopular with respect to different audiences, particular users, and/or in general. Such feedback may enable the auction module to learn more effective data associations between auction events and response to those auction events. Furthermore, such data associations may be determined with respect to particular users and/or with respect to groups of users.

In addition, the auction module 130 may be configured to receive and/or gather analytics information with respect to different vehicle characteristics (e.g., make, model, etc.). For example, certain models of vehicles uniformly include a particular feature, such as navigation. The auction module 130 may receive and/or gather analytics information indicating such characteristics of those models. As a result, the auction module 130 may avoid identifying media files that correspond to calling out the navigation feature for those models.

Additionally, it will appreciated that the auction module 130 may be configured to facilitate the playback of media files associated with auction events for multiple auctions simultaneously.

Referring again to the service provider server(s) 120, the one or more network and I/O interfaces 132 may include one or more communication interfaces or network interface devices to provide for the transfer of data between the bidder device 102 and another device (e.g., network server) via one or more networks, such as 118. The communication interfaces may include, but are not limited to: personal area networks (PANs), wired local area networks (LANs), wireless local area networks (WLANs), wireless wide area networks (WWANs), and so forth. The bidder device 102 may be coupled to the network via a wired connection. However, the wireless system interfaces may include the hardware and software to broadcast and receive messages either using the Wi-Fi Direct Standard (see Wi-Fi Direct specification published in October 2010) and/or the IEEE 802.11 wireless standard (see IEEE 802.11-2007, published Mar. 8, 2007; IEEE 802.11n-2009, published October 2009), or a combination thereof. The wireless system (not shown) may include a transmitter and a receiver or a transceiver (not shown) capable of operating in a broad range of operating frequencies governed by the IEEE 802.11 wireless standards. The communication interfaces may utilize acoustic, radio frequency, optical, or other signals to exchange data between the service provider server(s) 120, and another device, such as an access point, a host computer, a server, a router, a reader device, and the like. The networks 118 may include, but are not limited to, the Internet, a private network, a virtual private network, a wireless wide area network, a local area network, a metropolitan area network, a telephone network, and so forth.

The display 134 may include, but is not limited to, a liquid crystal display, a light-emitted diode display, or an E-Ink™ display as made by E Ink Corp. of Cambridge, Mass. The display 134 may be used to show content to a user in the form of text, images, or video. In certain instances, the display 134 may also operate as a touch screen display that may enable the user to initiate commands or operations by touching the screen using certain finger or hand gestures.

With continued reference to FIG. 1, the system 100 may also include one or more seller device(s). In general, the seller device 138 may refer to any type of electronic device, and, more particularly, may refer to one or more of the following: a wireless communication device, a portable electronic device, a telephone (e.g., cellular phone, smart phone), a computer (e.g., laptop computer, tablet computer), a wearable computer device, a portable media player, a personal digital assistant (PDA), or any other electronic device having a networked capability. The seller device(s) 138 may include one or more computer processors 140, and a memory 142 storing an operating system (O/S) 144 and a seller module 146. In addition, the seller device(s) 138 may include one or more network and I/O interfaces 148, and a display 148. In certain embodiments, the seller device(s) 138 may include one or more sensors capable of gathering information associated with a present environment of the seller device(s) 138, or similar hardware devices, such as a camera, microphone, antenna, a gesture capture or detection device, or Global Positioning Satellite (GPS) device.

As used herein, a seller may refer to a dealer/dealership, an original equipment manufacturer, a rental car company, and/or any other entity having an inventory of vehicles.

The computer processors 140 may comprise one or more cores and may be configured to access and execute (at least in part) computer-readable instructions stored in the memory 142. The one or more computer processors 140 may include, without limitation: a central processing unit (CPU), a digital signal processor (DSP), a reduced instruction set computer (RISC), a complex instruction set computer (CISC), a microprocessor, a microcontroller, a field programmable gate array (FPGA), or any combination thereof. The seller device 138 may also include a chipset (not shown) for controlling communications between the one or more processors 140 and one or more of the other components of the seller device 138. In certain embodiments, the seller device 138 may be based on an Intel® architecture or an ARM® architecture, and the processor(s) and chipset may be from a family of Intel® processors and chipsets. The one or more processors 140 may also include one or more application-specific integrated circuits (ASICs) or application-specific standard products (ASSPs) for handling specific data processing functions or tasks.

The memory 142 may include one or more computer-readable storage media (CRSM). In some embodiments, the memory 142 may include non-transitory media such as random access memory (RAM), flash RAM, magnetic media, optical media, solid state media, and so forth. The memory 142 may be volatile (in that information is retained while providing power) or non-volatile (in that information is retained without providing power). Additional embodiments may also be provided as a computer program product including a transitory machine-readable signal (in compressed or uncompressed form). Examples of machine-readable signals include, but are not limited to, signals carried by the Internet or other networks. For example, distribution of software via the Internet may include a transitory machine-readable signal. Additionally, the memory 142 may store an operating system 144 that includes a plurality of computer-executable instructions that may be implemented by the computer processor to perform a variety of tasks to operate the interface(s) and any other hardware installed on the seller device 138. The memory 142 may also store content that may be displayed by the seller device 138 or transferred to other devices (e.g., headphones) to be displayed or played by the other devices. The memory 142 may also store content received from the other devices. The content from the other devices may be displayed, played, or used by the seller device 138 to perform any necessary tasks or operations that may be implemented by the computer processor or other components in the seller device 138.

The memory 142 may also include an operating system (O/S) 144, which may provide an interface between other application software executing on the seller device 138 and hardware resources of the seller device 138. More specifically, the operating system 144 may include a set of computer-executable instructions for managing hardware resources of the seller device 138 and for providing common services to other application programs (e.g., managing memory allocation among various application programs). The operating system 144 may include any operating system now known or which may be developed in the future including, but not limited to, any bidder operating system, any server operating system, any mainframe operating system, or any other proprietary or freely available operating system.

The memory 142 may also include a seller module 146, which may be configured to communicate with users of the seller device 138 and/or the auction module 130 of the service provider server(s) 118. In certain embodiments, the seller module 138 may provide a user interface, such as the user interface 400 illustrated in FIG. 4, which enables a seller to input various information for the purpose of scheduling and/or creating an online vehicle auction. For instance, the seller module 138 may enable the seller to select one or more vehicles, such as from the seller inventory 152, to include in an online vehicle auction. Furthermore, the seller module 146 may enable the seller to provide an auction name, an auction date, and auction start time, and/or any other type of information related to an online vehicle auction.

The seller module 146 may enable the seller to select (e.g., via a user interface) various preferences with respect to auctioning and/or selling vehicles from the seller's inventory. For instance, in certain embodiments, the seller module 146 may enable the seller to indicate whether the seller would allow having a vehicle in the seller's inventory to be moved into other sales that may be initiated by another seller. To this end, the seller module 146 may determine (e.g., or receive determination by the auction module 130 of the service provider server 120) one or more recommended auctions and/or sales in which to move certain vehicles of the seller. For example, the seller module 146 (e.g., and/or auction module 130) may determine that an auction hosted by another seller may include bidders that have shown interest in a particular vehicle owned by the seller. As a result, the seller module 146 may recommend that the seller move the particular vehicle to the auction hosted by the other seller.

As another example, the seller module 146 may determine, based on vehicle characteristics and profile information of bidders at an auction, that a particular seller vehicle should be moved to the auction. Such a determination may be made dynamically, such as upon creation of the auction and/or during any other time. Furthermore, the seller module 146 may also be configured to automatically add the seller vehicle to the auction. Such automatic additions may depend on prior seller authorization to do so, such as according to various rules and preferences indicated by the seller.

In yet another example, the auction module 130 of the service provider server 120 may communicate with various seller modules 146 of various seller devices 138. As part of these communications, the auction module 130 may be configured to determine a plurality of vehicles that are being offered for sale by the various sellers of the seller device 138. Furthermore, the auction module 130 may access vehicle information associated with the plurality of vehicles. Based on the vehicle information, the auction module 130 may be configured to identify a subset of vehicles to be combined into a single sale event.

According to some embodiments, the seller module 146 may also enable the seller to select (e.g., via a user interface) certain parameters and/or preferences with respect to a floor price of one or more vehicles in one or more auctions. For instance, the seller module 146 may enable the seller to select a preference to automatically sell a vehicle if the vehicle is within a predetermined range of the floor price (e.g., within $200 of the floor price). In some implementations, the seller module 146 may enable to seller to select such a preference on a per-car basis.

Another preference may enable the seller module 146 to automatically consent to certain sales of vehicles with respect to a profitability goal of the seller being met. For instance, the seller may set a profitability goal of $10K for a set of 20 vehicles to be sold. If the seller module 146 determines that the profitability goal has been met after the sale of 15 vehicles of the original 20 vehicle to be sold, the seller module 146 may be configured to sell the remaining vehicles below their respective floor prices. These automatic sales may be contingent on the total profitability for the seller remaining at or above the $10K profitability goal. In addition, the system may provide the seller with a guarantee run list price. The guarantee run list price may be the total sales price of all of the vehicles in a run list and/or the total profit (gross or percentage) for selling all or some of the vehicles in the run list. In this manner, an online auction may be conducted in which the run list includes the seller's vehicles. Based on the vehicles in the run list, the system may determine a guarantee run list price for selling all or some of the vehicles in the run list and provide this information to the seller. If the seller accepts the guarantee run list price, the system may conduct an auction of the seller's vehicles. During the auction, the system may dynamically determine the run order, the starting price, the reserve price, etc. for each of the vehicles. In one example, if the system determines that the total sales and/or profitability goal has been met after the sale of 15 vehicles of the original 20 vehicle to be sold, the system may be configured to sell the remaining vehicles below their respective floor prices. These automatic sales may be contingent on the total sales and/or profitability for the seller remaining at or above the guarantee run list price.

In other implementations, the seller module 146 may be configured to notify the seller that a floor price of a vehicle has not yet been reached. For example, such a notification may be provided to the seller if the vehicle has not yet reached the floor price, and if the auction for the vehicle is ending soon (e.g., there has been no bidding activity associated with the vehicle for a predetermined amount of time). As part of the notification, the seller module 146 may also present the seller with the option of whether or not to consent to the sale of the vehicle below the floor price.

Referring again to the seller device 138, the one or more network and I/O interfaces 148 may include one or more communication interfaces or network interface devices to provide for the transfer of data between the seller device 138 and another device (e.g., network server) via one or more networks, such as 118. The communication interfaces may include, but are not limited to: personal area networks (PANs), wired local area networks (LANs), wireless local area networks (WLANs), wireless wide area networks (WWANs), and so forth. The seller device 138 may be coupled to the network via a wired connection. However, the wireless system interfaces may include the hardware and software to broadcast and receive messages either using the Wi-Fi Direct Standard (see Wi-Fi Direct specification published in October 2010) and/or the IEEE 802.11 wireless standard (see IEEE 802.11-2007, published Mar. 8, 2007; IEEE 802.11n-2009, published October 2009), or a combination thereof. The wireless system interfaces may also include cellular standards such as Long-Term Evolution (LTE), LTE-Advanced, Global System for Mobile (GSM), code division multiple access (CDMA), and/or the like. The wireless system (not shown) may include a transmitter and a receiver or a transceiver (not shown) capable of operating in a broad range of operating frequencies governed by the IEEE 802.11 wireless standards. The communication interfaces may utilize acoustic, radio frequency, optical, or other signals to exchange data between the seller device 138 and another device, such as an access point, a host computer, a server, a router, a reader device, and the like. The networks 118 may include, but are not limited to, the Internet, a private network, a virtual private network, a wireless wide area network, a local area network, a metropolitan area network, a telephone network, and so forth.

The display 150 may include, but is not limited to, a liquid crystal display, a light-emitted diode display, or an E-Ink™ display as made by E Ink Corp. of Cambridge, Mass. The display 150 may be used to show content to a user in the form of text, images, or video. In certain instances, the display 150 may also operate as a touch screen display that may enable the user to initiate commands or operations by touching the screen using certain finger or hand gestures.

Figure 2:
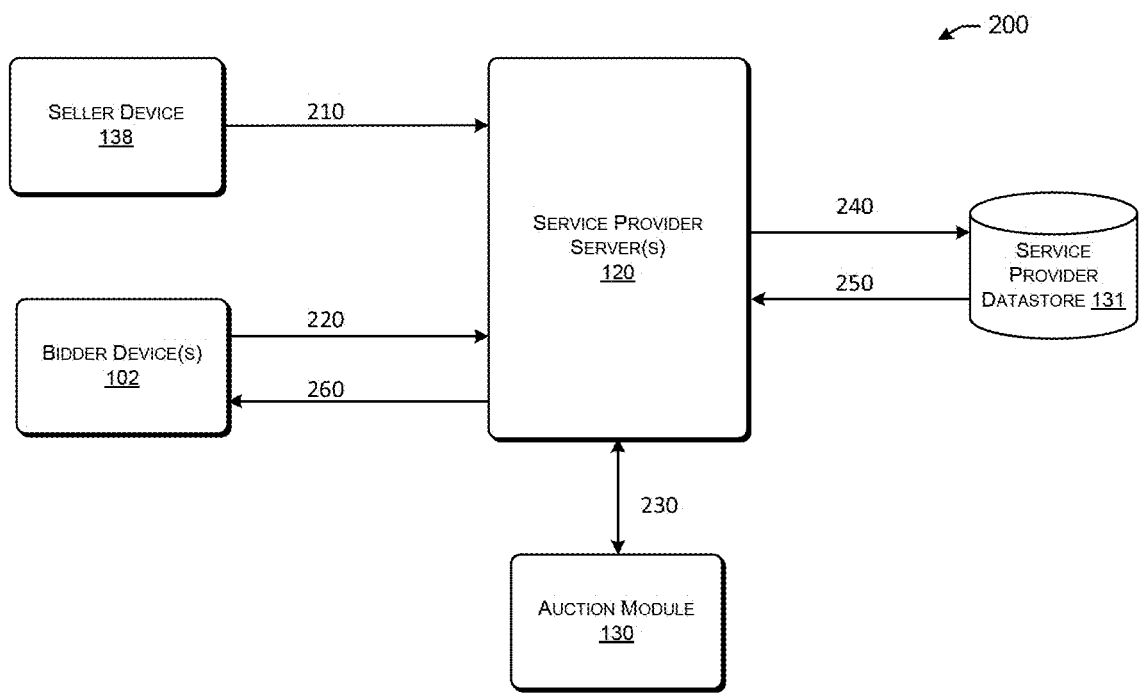
FIG. 2 shows a data flow diagram related to facilitating media playback in online auctions according to one or more example embodiments.
Figure 3:
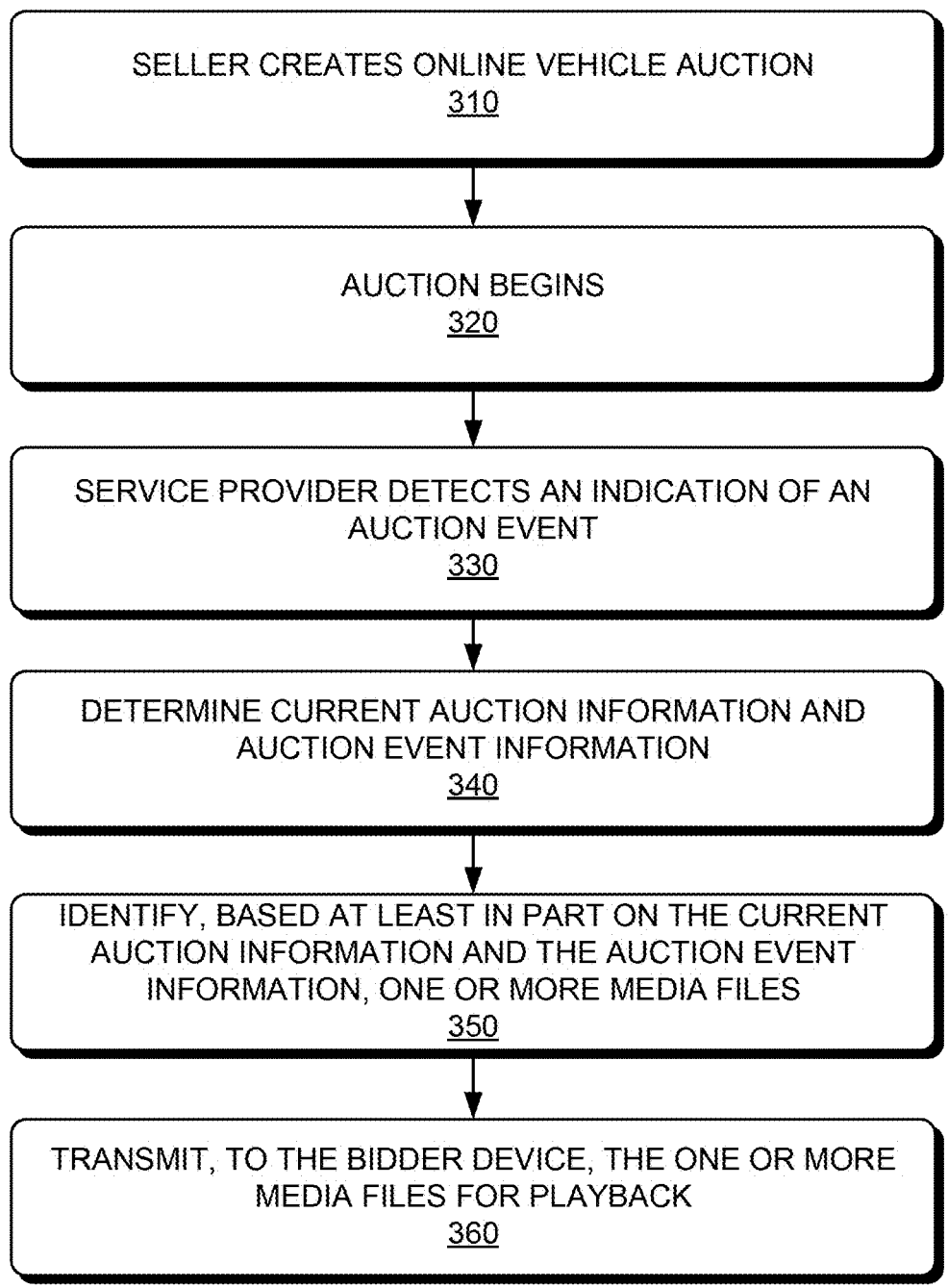
FIG. 3 shows a flow diagram of a method for facilitating media playback in online auctions according to one or more example embodiments.

Referring now to FIG. 2, a diagram of a data flow 200 is illustrated for facilitating media playback in online auctions in accordance with one or more example embodiments. FIG. 3 illustrates a method 300 for facilitating media playback in online auctions in accordance with one or more example embodiments. The method 300 of FIG. 3 will now be described in conjunction with references to the data flow in FIG. 2. It will be appreciated that while the following description may reference an online vehicle auction, any other types of online auction are also contemplated.

The method 300 may begin in block 310, where a seller may interact with the service provider server(s) 120 and/or the auction module 130 to create an online vehicle auction. For instance, the seller device 138 may transmit one or more selected inputs 210 to the service provider server 120. In block 320, the online vehicle auction may begin.

In block 330, the service provider server(s) 120 and/or the auction module 130 may detect an indication of an auction event during operation of the online vehicle auction. For instance, one or more transmissions 220 from the bidder devices 102 may be identified as auction events (e.g., transmission of one or more auction bids). As another example, the auction module 130 may be configured to monitor 230 the online vehicle auction and determine/detect auction events as they occur or are about to occur, such as a welcome announcement, an auction start time, a vehicle introduction, an auction bid, a new auction ask price, a sold vehicle, an unsold vehicle, an time remaining threshold, an elapsed time with no bidding, or an auction end time.

In block 340, the service provider server(s) 120 may determine (e.g., via the auction module 130) current auction information associated with the online auction and auction event information associated with the auction event. As such, in block 350, the service provider server(s) 120 and/or the auction module 130 may identify, based at least in part on the current auction information and the auction event information, one or more media files. For instance, the service provider server(s) 120 and/or the auction module 130 may be configured to access 240 the service provider datastore 131, using the current auction information and the auction even information, in order to identify the media files 250.

In block 360, upon identifying the media files 250, the service provider server(s) 120 and/or the auction module 130 may be configured transmit 360 the identified media files to the bidder device 102. The bidder device 102 may then be configured to playback the one or more media files in response to the auction event.

Figure 4:
FIG. 4 shows user interface for creating an online vehicle auction, according to one or more example embodiments.

Referring now to FIG. 4, a user interface 400 for creating an online auction is provided in accordance with one or more example embodiments. In some embodiments, the user interface 400 may be provided to a seller device 138, such as via the seller module 146. Furthermore, in certain implementations, the user interface 400 may be presented on a web page, such as a web page provided by the service provider server 120.

As illustrated in FIG. 4, the user interface 400 may enable the seller device 138 to input various auction creation information in order to create and/or schedule an online vehicle auction. As such, the user interface 400 may include a name input field 410, in which a seller may input a desired name for an online vehicle auction. Additionally, the user interface 400 may include a date input field 420, in which a seller may input a desired date at which the online vehicle auction should start. Furthermore, the user interface 400 may include a time input field, which may seller may use to indicate a desired time at which the online vehicle auction should begin. It should be understood that while there may be a start time for the auction of each vehicle in an auction, or there may be a start time for the auction, and then each vehicle in the auction will follow sequentially after the preceding vehicle has sold or been determined to be a no-sale vehicle.

According to some embodiments, the user interface 400 may also include select components 440A-D, which may be associated with respective vehicles (e.g., identified by respective vehicle identification numbers (VINs)) in the seller's inventory (e.g., seller inventor 152). To this end, the seller and/or seller device 138 may select a selectable component 440A-D, to indicate a desire to include the corresponding vehicle in online vehicle auction. In other implementations, though not illustrated, the user interface 400 may also enable the seller to input various pricing information associated with the various vehicles in the seller inventory 152. For example, the user interface 400 may enable the seller and/or seller device 138 to input a floor price associated with a vehicle, which may indicate the lowest price at which the seller is willing to divest the vehicle at the online vehicle auction.

Certain embodiments of the present disclosure are described above with reference to block and flow diagrams of systems and methods and/or computer program products according to example embodiments of the present disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the present disclosure.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the present disclosure may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain embodiments of the present disclosure have been described in connection with what is presently considered to be the most practical and various embodiments, it is to be understood that the present disclosure is not to be limited to the disclosed embodiments, but is intended to cover various modifications and equivalent arrangements included within the scope of the appended claims. Although specific terms are employed herein, they are used in a generic and descriptive sense only and not for purposes of limitation.

This written description uses examples to disclose certain embodiments of the present disclosure, including the best mode, and also to enable any person skilled in the art to practice certain embodiments of the present disclosure, including making and using any devices or systems and performing any incorporated methods. The patentable scope of certain embodiments of the present disclosure is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for operating previously unscheduled, spontaneous online auctions, comprising:
    determining, by a service provider server comprising one or more processors, bidder preference information;
    determining, based at least in part on the bidder preference information, that a threshold number of bidders have a common bidder preference;
    identifying, based at least in part on the common bidder preference, one or more vehicles for an online auction that include an attribute associated with the common bidder preference;
    inviting a number of bidders associated with the common bidder preference to participate in the online auction of the one or more vehicles that include the attribute associated with the common bidder preference;
    arranging a run list order in the online auction based on the common bidder preference;
    conducting the online auction;
    detecting an indication of an auction event associated with the online vehicle auction for the one or more vehicles;
    determining current auction information associated with the online vehicle auction;
    determining auction event information associated with the auction event;
    identifying, based at least in part on the current auction information and the auction event information, one or more media files for playback on a bidder device;
    determining a sequence in which to play the one or media files; and
    transmitting, to the bidder device in response to the indication of the auction event, the one or more media files for playback on the bidder device according to the determined sequence, wherein playback of the one or more media files according to the determined sequence results in acoustic output of one or more auctioneer phrases.

2. The method of claim 1, further comprising:
    updating the arrangement of the run list order after the online auction has started based on current bidding activity of the bidders.

3. The method of claim 1, further comprising:
    updating the arrangement of the run list order after the online auction has started based on one or more of the bidders leaving or joining the online auction.

4. The method of claim 1, further comprising:
    updating the arrangement the run list order after the online auction has started to increase an interest of the bidders in the online auction.

5. The method of claim 1, wherein transmitting the one or more media files comprises:
    streaming the one or more media files to the bidder device.

6. The method of claim 1, further comprising:
    selecting, based at least in part on the current auction information and the auction event information, one or more bidder devices from a plurality of bidder devices; and
    streaming the one or more media files to the selected one or more bidder devices.

7. The method of claim 1, wherein the one or more media files comprise information associated with one or more auction announcements.

8. The method of claim 1, wherein identifying the one or more media files is further based at least in part on one or more auction announcement options associated with the bidder device.

9. The method of claim 1, wherein the auction information comprises information associated with at least one of an auction identifier, a bidder name, a seller name, a current ask price, one or more vehicle attributes associated with the one or more vehicles, or an auction location.

10. The method of claim 1, wherein the auction event information comprises information associated with at least one of a welcome announcement, an auction start time, a vehicle introduction, an auction bid, a new auction ask price, a sold vehicle, an unsold vehicle, an time remaining threshold, an elapsed time with no bidding, or an auction end time.

11. The method of claim 1, wherein the one or more media files comprises one or more prerecorded audio files, one or more video files, or one or more text files.

12. A service provider server, comprising:
    at least one processor;
    at least one memory storing computer-readable instructions, that when executed by the at least one processor, cause the at least one processor to:
    determine bidder preference information;
    determine, based at least in part on the bidder preference information, that a threshold number of bidders have a common bidder preference;
    identify, based at least in part on the common bidder preference, one or more vehicles for online auction that include an attribute associated with the common bidder preference;
    invite a number of bidders associated with the common bidder preference to participate in the online auction of the one or more vehicles that include the attribute associated with the common bidder preference;
    arrange a run list order in the online auction based on the common bidder preference;
    conduct the online auction;
    detect an indication of an auction event associated with the online vehicle auction for the one or more vehicles;
    determine current auction information associated with the online vehicle auction;
    determine auction event information associated with the auction event;

identify, based at least in part on the current auction information and the auction event information, one or more media files for playback on a bidder device;

determine a sequence of playback of the one or media files; and transmit, to the bidder device in response to the indication of the auction event, the one or more media files for playback on the bidder device according to the determined sequence, wherein playback of the one or more media files according to the determined sequence results in acoustic output of one or more auctioneer phrases.

13. The service provider server of claim 12, wherein the computer-executable instruction to:

arrange the run list order in the online auction based on current and/or prior bidding activity of the bidders.

14. The service provider server of claim 12, wherein the computer-executable instruction to:

arrange the run list order in the online auction based on one or more of the bidders leaving or joining the online auction.

15. The service provider server of claim 12, wherein the computer-executable instruction to:

arrange the run list order in the online auction to increase an of the bidders in the online auction.

16. The service provider server of claim 12, wherein the computer-executable instruction to:

stream the one or more media files to the bidder device.

17. The service provider server of claim 12, further comprising computer-executable instruction to:

select, based at least in part on the current auction information and the auction event information, one or more bidder devices from a plurality of bidder devices; and stream the one or more media files to the selected one or more bidder devices.

18. A non-transitory computer-readable medium storing computer-executable instructions that when executed by one or more processors, cause the one or more processors to:

determine bidder preference information;

determine, based at least in part on the bidder preference information, that a threshold number of bidders have a common bidder preference;

identify, based at least in part on the common bidder preference, one or more vehicles for online auction that include an attribute associated with the common bidder preference;

invite a number of bidders associated with the common bidder preference to participate in the online auction of the one or more vehicles that include the attribute associated with the common bidder preference;

arrange a run list order in the online auction based on the common bidder preference;

conduct the online auction;

detect an indication of an auction event associated with the online vehicle auction for the one or more vehicles;

determine current auction information associated with the online vehicle auction;

determine auction event information associated with the auction event;

identify, based at least in part on the current auction information and the auction event information, one or more media files for playback on a bidder device;

determine a sequence of playback of the one or media files; and transmit, to the bidder device in response to the indication of the auction event, the one or more media files for playback on the bidder device according to the determined sequence, wherein playback of the one or more media files according to the determined sequence results in acoustic output of one or more auctioneer phrases.

* * * * *